(12) United States Patent
Devarakonda et al.

(10) Patent No.: US 8,762,525 B2
(45) Date of Patent: Jun. 24, 2014

(54) MANAGING RISK IN RESOURCE OVER-COMMITTED SYSTEMS

(75) Inventors: Murthy V. Devarakonda, Peekskill, NY (US); Rahul Ghosh, Durham, NC (US); Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 13/415,468

(22) Filed: Mar. 8, 2012

(65) Prior Publication Data

US 2013/0238780 A1   Sep. 12, 2013

(51) Int. Cl.
G06F 15/16      (2006.01)
G06F 15/173     (2006.01)
G06F 15/177     (2006.01)
G06F 12/00      (2006.01)
G06F 9/455      (2006.01)
G06F 9/46       (2006.01)

(52) U.S. Cl.
USPC ........... 709/224; 709/218; 709/220; 709/223; 709/226; 711/122; 711/162; 718/1; 718/102; 718/105

(58) Field of Classification Search
None
See application file for complete search history.

(56) References Cited

U.S. PATENT DOCUMENTS

| 6,757,729 B1* | 6/2004 | Devarakonda et al. | 709/226 |
|---|---|---|---|
| 8,185,893 B2* | 5/2012 | Hyser et al. | 718/1 |
| 2005/0021698 A1* | 1/2005 | Devarakonda et al. | 709/220 |
| 2007/0043860 A1* | 2/2007 | Pabari | 709/224 |
| 2008/0104608 A1* | 5/2008 | Hyser et al. | 718/105 |
| 2008/0295096 A1* | 11/2008 | Beaty et al. | 718/1 |
| 2010/0058342 A1* | 3/2010 | Machida | 718/1 |
| 2010/0070725 A1* | 3/2010 | Prahlad et al. | 711/162 |
| 2010/0306163 A1* | 12/2010 | Beaty et al. | 706/52 |
| 2011/0066727 A1* | 3/2011 | Palmer et al. | 709/224 |
| 2011/0078303 A1* | 3/2011 | Li et al. | 709/224 |
| 2011/0173329 A1* | 7/2011 | Zhang et al. | 709/226 |
| 2011/0276695 A1* | 11/2011 | Maldaner | 709/226 |
| 2012/0053925 A1* | 3/2012 | Geffin et al. | 703/21 |
| 2012/0072581 A1* | 3/2012 | Tung et al. | 709/224 |
| 2012/0101968 A1* | 4/2012 | Banerjee et al. | 706/21 |
| 2012/0102190 A1* | 4/2012 | Durham et al. | 709/224 |

(Continued)

OTHER PUBLICATIONS

Ghosh et al., "Biting off Safely More than You Can Chew: Predictive Analytics for Resource Over-commit in IaaS Cloud," Proceedings of the IEEE Fifth International Conference on Cloud Computing (CLOUD), Jun. 2012, 8 pages.

(Continued)

*Primary Examiner* — Ario Etienne
*Assistant Examiner* — Ho Shiu
(74) *Attorney, Agent, or Firm* — Yee & Associates, P.C.; Louis J. Percello

(57) ABSTRACT

Risk associated with over-committing shared resources is determined. In response to receiving a request to provision a new workload, a candidate mix of virtual machines is selected from plurality of virtual machines already running on a cloud infrastructure. A utilization profile is then created for an aggregate behavior of the candidate mix of virtual machines and a new virtual machine running the new workload. A risk inherent in over-commitment if the new workload is grouped with the candidate mix of virtual machines is determined, and whether that risk is acceptable. If the risk is acceptable, the new workload is provisioned by over-committing the candidate mix of virtual machines with the new virtual machine running on the cloud infrastructure.

22 Claims, 13 Drawing Sheets

(56) References Cited

U.S. PATENT DOCUMENTS

| | | | | |
|---|---|---|---|---|
| 2012/0226866 | A1* | 9/2012 | Bozek et al. | 711/122 |
| 2012/0278800 | A1* | 11/2012 | Nicholas et al. | 718/1 |
| 2012/0284408 | A1* | 11/2012 | Dutta et al. | 709/226 |
| 2012/0304179 | A1* | 11/2012 | Devarakonda et al. | 718/102 |
| 2012/0324073 | A1* | 12/2012 | Dow et al. | 709/223 |
| 2012/0324112 | A1* | 12/2012 | Dow et al. | 709/226 |
| 2012/0324444 | A1* | 12/2012 | Gulati et al. | 718/1 |
| 2012/0324445 | A1* | 12/2012 | Dow et al. | 718/1 |
| 2012/0331127 | A1* | 12/2012 | Wang et al. | 709/224 |

OTHER PUBLICATIONS

Gordon et al., "Ginkgo: Automated, Application-Driven Memory Overcommitment for Cloud Computing," ASPLOS Workshop on Runtime Enviroments/Systems, Layering, and Virtual Environments (ASPLOS 2011), Mar. 2011, 6 pages.

Hillier, "Analytics for Internal Cloud Management," CiBRA, Inc., Sep. 2012, 13 pages.

Hines et al., "Applications Know Best: Performance-Driven Memory Overcommit with Ginkgo," Proceedings of the IEEE Third International Conference on Cloud Computing Technolgy and Science (CloudCom), Nov.-Dec. 2011, 8 pages.

Nathuji et al., "Q-Clouds: Managing Performance Interference Effects for QoS-Aware Clouds," Proceedings of the Fifth European Conference on Computer Systems (EuroSys '10), Aug. 2010, 14 pages.

Tsakalozos et al., "VM Placement in non-Homogeneous IaaS Clouds," Proceedings of the Ninth International Conference on Service-Oriented Computing (ICSOC 2011), Dec. 2011, 16 pages.

Urgaonkar et al., "Resource Overbooking and Application Profiling in Shared Hosting Platforms," Proceedings of the 5th Symposium on Operating Systems Design and Implementation (OSDI '02), Dec. 2002, 16 pages.

Vin et al., "A Statistical Admission Control Algorithm for Multimedia Servers," Proceedings of the ACM International Conference on Multimedia (Multimedia '94), Oct. 1994, 9 pages.

Williams et al., "Overdriver: Handling Memory Overload in an Oversubscribed Cloud," Proceedings of the 7th ACM SIGPLAN/SIGOPS International Conference on Virtual Execution Environments (VEE '11), Mar. 2011, 12 pages.

\* cited by examiner

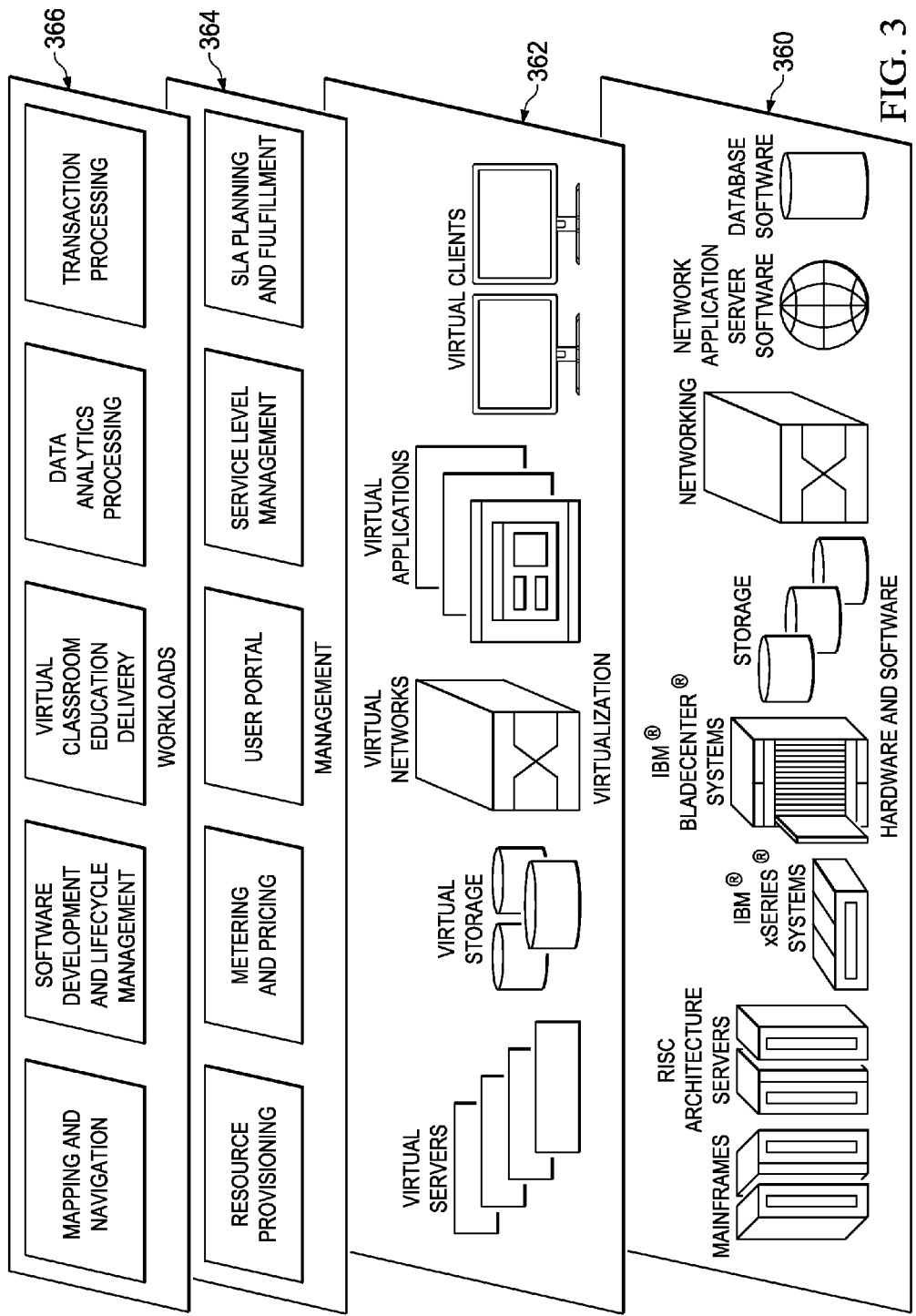

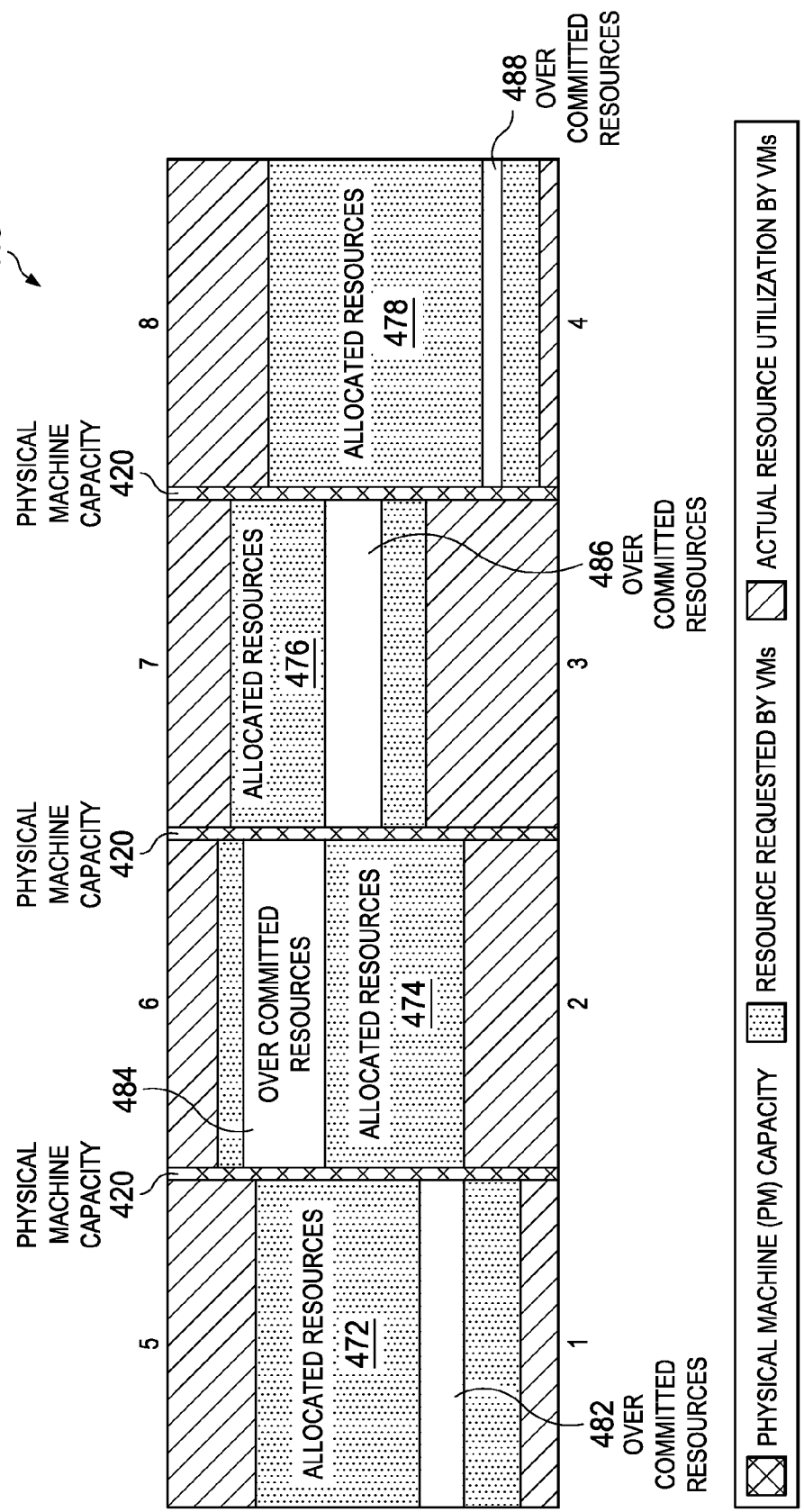

PREDICTED AGGREGATE VM GROUP UTILIZATION (70% THRESHOLD)

| VALUE OF CONFIDENCE LEVEL (GAMMA) | LOWER BOUND OF PROBABILITY OF BEING WITHIN THE THRESHOLD: (BETA) | UPPER BOUND OF PROBABILITY OF EXCEEDING THE THRESHOLD: (1-BETA) |
|---|---|---|
| 90% | 87.01% | 12.99% |
| 95% | 85.92% | 14.08% |
| 99% | 83.73% | 16.27% |

PREDICTED AGGREGATE VM GROUP UTILIZATION (95% THRESHOLD)

| VALUE OF CONFIDENCE LEVEL (GAMMA) | LOWER BOUND OF PROBABILITY OF BEING WITHIN THE THRESHOLD: (BETA) | UPPER BOUND OF PROBABILITY OF EXCEEDING THE THRESHOLD: (1-BETA) |
|---|---|---|
| 90% | 99.83% | 0.17% |
| 95% | 99.77% | 0.23% |
| 99% | 99.61% | 0.39% |

QUANTIFYING THE RISK OF EXCEEDING THE SET THRESHOLD

| (GAMMA, BETA)% | TOLERANCE LIMIT | RISK (FOR 70% THRESHOLD) | RISK (FOR 95% THRESHOLD) |
|---|---|---|---|
| (90, 90) | 72.13% | 3.04% | -99.24% |
| (90, 95) | 77.15% | 10.22% | -99.19% |
| (90, 99) | 86.65% | 23.79% | -99.09% |
| (95, 90) | 72.87% | 4.10% | -99.23% |
| (95, 95) | 78.01% | 11.44% | -99.18% |
| (95, 99) | 87.74% | 25.35% | -99.08% |
| (99, 90) | 74.35% | 6.21% | -99.22% |
| (99, 95) | 79.72% | 13.88% | -99.16% |
| (99, 99) | 89.92% | 28.46% | -99.05% |

MANAGING RISK IN RESOURCE OVER-COMMITTED SYSTEMS

BACKGROUND

1. Field

The disclosure relates generally to a computer implemented method, a data processing system, and computer program product for provisioning workloads. More specifically, the disclosure relates to a computer implemented method, a data processing system, and computer program product for determining risk associated with provisioning workloads by over-committing of shared resources.

2. Description of the Related Art

Cloud computing is a model of service delivery for enabling convenient, on-demand network access to a shared pool of configurable computing resources that can be rapidly provisioned and released with minimal management effort or interaction with a provider of the service. For example, cloud computing allows a consumer to obtain data processing resources, such as networks, network bandwidth, servers, processing, memory, storage, applications, virtual machines, and services as a service on a temporary basis when needed. Several vendors are currently offering various cloud services. For example, such services include infrastructure as a service, platform as a service, storage as a service, software as a service, and business process as a service cloud services. These services use vendor-specific service request, access, and consumption models.

A consumer of cloud computing services may have its own data processing system resources. For example, the consumer may be a business or other entity. The consumer may have invested in its own data processing system resources. These resources may include a computer network. The consumer's computer network provides a limited amount of processing capability and data storage resources. The consumer's computer network also provides specific data processing applications. The consumer's computer network may be located on-premise and may be operated as a private cloud.

At certain times, the consumer may require data processing resources beyond those available in its computer network. For example, at certain times, the demand for data processing resources may outstrip the capability of the consumer's computer network. At these times, the response time of the consumer's computer network for some applications may increase to unacceptable levels. At other times, the consumer may require data processing applications that are not available on the consumer's own computer network. For example, the consumer may require, at times, the use of data processing applications that are not part of the consumer's core competency.

At those times when the consumer requires data processing resources beyond its own, the consumer may purchase such resources as a service on a temporary basis from a provider of cloud computing services. For example, the consumer may obtain additional processing, storage resources, or specific application functionality as a service on a temporary basis from the cloud computing provider's data processing resources. Different types of service offerings may provide parts of the solution used in processing the consumer's workload. The provider's available data processing resources are known as a public cloud.

The consumer typically continues to operate its own computer network while some data processing resources are being obtained from a public cloud. Thus, data processing resources from the public cloud typically are obtained in order to supplement the data processing resources of the consumer's own private cloud at certain times of need. The simultaneous and coordinated operation of data processing resources from multiple clouds may be referred to as hybrid cloud computing. For example, operation of the consumer's private cloud along with resources obtained from one or more public clouds is a specific example of hybrid cloud computing.

SUMMARY

According to one embodiment of the present invention, a computer-implemented method is provided for determining risk associated with over-committing shared resources. In response to receiving a request to provision a new workload, a candidate mix of virtual machines is selected from plurality of virtual machines already running on a cloud infrastructure. A utilization profile is then created for an aggregate behavior of the candidate mix of virtual machines and a new virtual machine running the new workload. A risk inherent in over-commitment if the new workload is grouped with the candidate mix of virtual machines is determined, and whether that risk is acceptable. If the risk is acceptable, the new workload is provisioned by over-committing the resources of the cloud infrastructure to the candidate mix of virtual machines and the new virtual machine and running them on the shared cloud infrastructure.

According to another embodiment of the present invention, a data processing system is provided for determining risk associated with over-committing shared resources. In response to receiving a request to provision a new workload, a candidate mix of virtual machines is selected from plurality of virtual machines already running on a cloud infrastructure. A utilization profile is then created for an aggregate behavior of the candidate mix of virtual machines and a new virtual machine running the new workload. A risk inherent in over-commitment if the new workload is grouped with the candidate mix of virtual machines is determined, and whether that risk is acceptable. If the risk is acceptable, the new workload is provisioned by over-committing the candidate mix of virtual machines with the new virtual machine running on the cloud infrastructure.

According to one embodiment of the present invention, a computer program product is provided for determining risk associated with over-committing shared resources. In response to receiving a request to provision a new workload, a candidate mix of virtual machines is selected from plurality of virtual machines already running on a cloud infrastructure. A utilization profile is then created for an aggregate behavior of the candidate mix of virtual machines and a new virtual machine running the new workload. A risk inherent in over-commitment if the new workload is grouped with the candidate mix of virtual machines is determined, and whether that risk is acceptable. If the risk is acceptable, the new workload is provisioned by over-committing the candidate mix of virtual machines with the new virtual machine running on the cloud infrastructure.

BRIEF DESCRIPTION OF THE SEVERAL VIEWS OF THE DRAWINGS

FIG. 3 is a set of functional abstraction layers is depicted in accordance with an illustrative embodiment;

FIG. 15 is a table of exemplary predicted aggregate utilization for a workload grouping for various confidence levels depicted in accordance with an illustrative embodiment; and FIG. 16 is a table showing an exemplary quantification of risk for an aggregate utilization of a workload grouping exceeding an upper tolerance threshold depicted in accordance with an illustrative embodiment.

DETAILED DESCRIPTION

Figure 1:
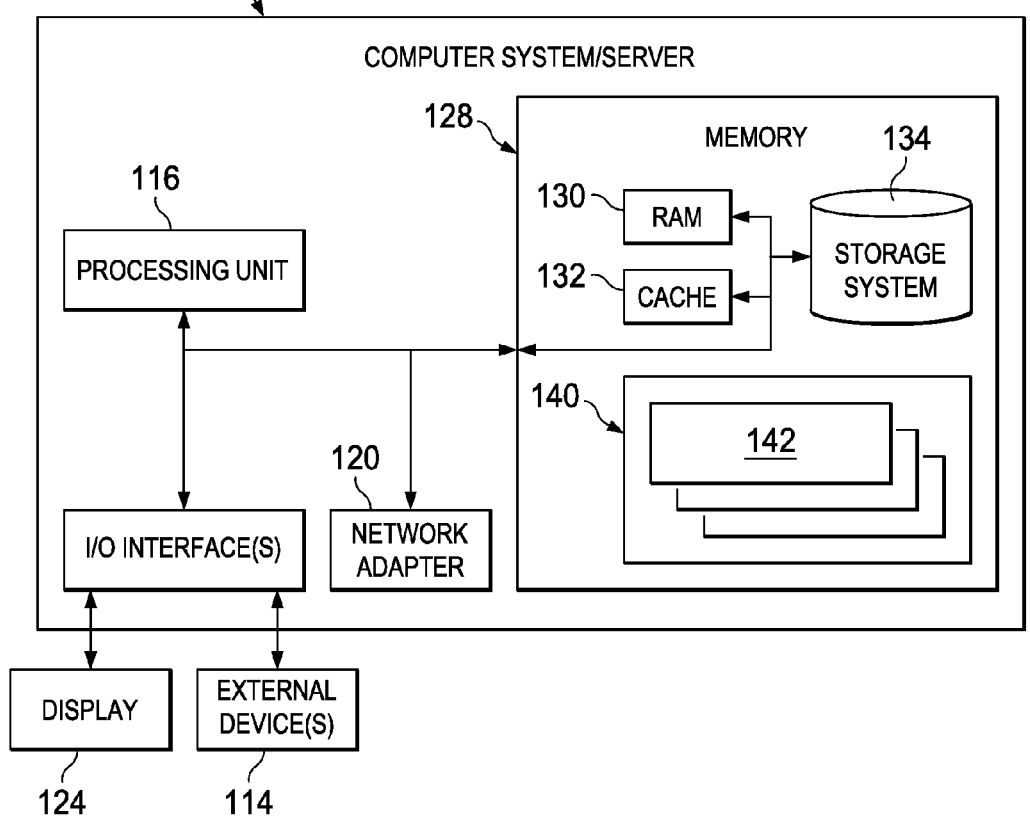
FIG. 1 is a schematic of an example of a cloud computing node depicted in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the detailed description includes the following definitions that have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases, automatically to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or consumer-acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software that can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds) and service interoperability.

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is depicted in accordance with an illustrative embodiment. Cloud computing node 110 is only one example of a suitable cloud computing node and is not intended to suggest any limitation as to the scope of use or functionality of the illustrative embodiments described herein. Regardless, cloud computing node 110 is capable of being implemented and/or performing any of the functionality set forth hereinabove.

In cloud computing node 110 there is computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system/server 112 may be described in the general context of computer system executable instructions, such as program modules being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processor unit 116, system memory 128, and bus 118 that couples various system components including system memory 128 to processor unit 116.

Processor unit 116 executes instructions for software that may be loaded into system memory 128. Processor unit 116 may be a number of processors, a multi-processor core, or some other type of processor, depending on the particular implementation. A number, as used herein with reference to an item, means one or more items. Further, processor unit 116 may be implemented using a number of heterogeneous processor systems in which a main processor is present with secondary processors on a single chip. As another illustrative example, processor unit 116 may be a symmetric multi-processor system containing multiple processors of the same type.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112 and it includes both volatile media, non-volatile media, removable media, and non-removable media.

System memory 128 can include computer system readable media in the form of volatile memory, such as random access memory (RAM) 130 and/or cache memory 132. Computer system/server 112 may further include other removable/non-removable and volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the illustrative embodiments.

Program/utility 140, having a set (at least one) of program modules 142, may be stored in memory 128 by way of example and not limitation, as well as an operating system, one or more application programs, other program modules, and program data. Each of the operating systems, one or more application programs, other program modules, and program data or some combination thereof, may include an implementation of a networking environment. Program modules 142 generally carry out the functions and/or methodologies of the illustrative embodiments as described herein.

Computer system/server 112 may also communicate with one or more external devices 114, such as a keyboard, a pointing device, display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks, such as a local area network (LAN), a general wide area network (WAN), and/or a public network (e.g., the Internet) via network adapter 120. As depicted, network adapter 120 communicates with the other components of computer system/server 112 via bus 118. It should be understood that, although not shown, other hardware and/or software components could be used in conjunction with computer system/server 112. Examples include, but are not limited to, microcode, device drivers, redundant processing units, external disk drive arrays, RAID systems, tape drives, and data archival storage systems, etc.

Figure 2:
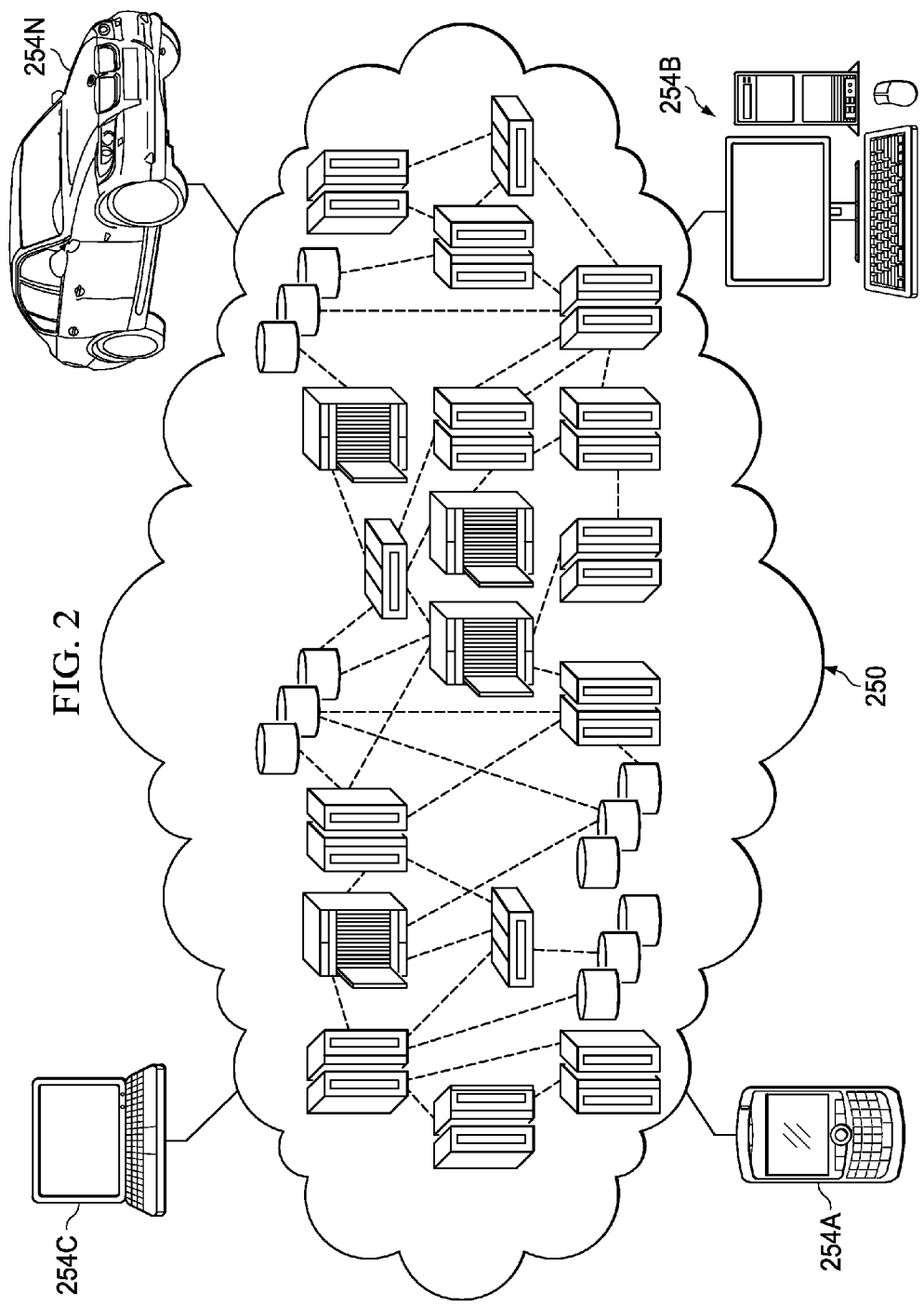
FIG. 2 is an illustration of a cloud computing environment is depicted in accordance with an illustrative embodiment.

Referring now to FIG. 2, an illustration of a cloud computing environment is depicted in accordance with an illustrative embodiment. In this illustrative example, cloud computing environment 250 comprises one or more cloud computing nodes 210 with which local computing devices used by cloud consumers may communicate. For example, cloud computing node 110 in FIG. 1 is one example of cloud computing nodes 210. Local computing devices which may communicate with cloud computing nodes 210 may include, for example, personal digital assistant (PDA) or cellular telephone 254A, desktop computer 254B, laptop computer 254C, and/or automobile computer system 254N. Cloud computing nodes 210 may communicate with one another. They may be grouped (not shown) physically or virtually, in one or more networks, such as private, community, public, or hybrid clouds as described hereinabove or a combination thereof. This allows cloud computing environment 250 to offer infrastructure, platforms, and/or software as services for which a cloud consumer does not need to maintain resources on a local computing device. It is understood that the types of computing devices 254A, 254B, 254C, and 254N shown in FIG. 2 are intended to be illustrative only and that cloud computing nodes 210 and cloud computing environment 250 can communicate with any type of computerized device over any type of network and/or network addressable connection (e.g., using a web browser). Program code located on one of cloud computing nodes 210 may be stored on a computer recordable storage medium in one of cloud computing nodes 210 and downloaded to a computing device within computing devices 254A, 254B, 254C, and 254N over a network for use in these computing devices. For example, a server computer in cloud computing nodes 210 may store program code on a computer readable storage medium on the server computer. The server computer may download the program code to a client computer in computing devices 254A, 254B, 254C, and 254N for use on the client computer.

Referring now to FIG. 3, a set of functional abstraction layers is depicted in accordance with an illustrative embodiment. The set of functional abstraction layers may be provided by cloud computing environment 250 in FIG. 2. It should be understood in advance that the components, layers, and functions shown in FIG. 3 are intended to be illustrative only and illustrative embodiments are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter®systems; storage devices; networks and networking components. Examples of software components include network application server software, in one example IBM® WebSphere® application server software; and database software, in one example IBM® DB2® database software. (IBM®, zSeries®, pSeries®, xSeries®, BladeCenter®, WebSphere®, and DB2® are trademarks of International Business Machines Corporation registered in many jurisdictions worldwide)

Virtualization layer 362 provides an abstraction layer from which the following examples of virtual entities may be provided: virtual servers; virtual storage; virtual networks including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and pricing provide usage and cost tracking as resources are utilized within the cloud computing environment and billing or invoicing for consumption of these resources. In one example, these resources may comprise application software licenses. Security provides identity verification for cloud consumers and tasks as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Providers of cloud computing services are constantly looking for ways to increase revenue and reduce costs without adding extra hardware capacity. Increased revenue and reduced costs can be obtained by reducing capacity requirements or by supporting more users within the cloud computing environment. Over-committing of physical resources, without adding more capacity, is one such approach.

Over-committing of physical resources occurs when the configurable computing resources allocated to various cloud computing nodes, such as cloud computing nodes 210 of FIG. 2, exceed the actual computing resources of the provider's cloud infrastructure. Individual workloads executing in the cloud environment tend to be "peaky." At any given time, workloads tend to utilize only a small fraction of their allocated physical resources. Those workloads may then experience intermittent spikes in activity where a greater percentage of the allocated resources are utilized by the workload. Workloads that tend to be "peaky" are especially attractive targets for over-commitment because such workloads rarely utilize all the system resources that they are entitled to.

Thus, illustrative embodiments of the present invention provide a computer implemented method, computer system, and computer program product for determining risk associated with over-committing shared resources. In response to receiving a request to provision a new workload, a candidate mix of virtual machines is selected from plurality of virtual machines already running on a cloud infrastructure. A utilization profile is then created for an aggregate behavior of the candidate mix of virtual machines and a new virtual machine running the new workload. A risk inherent in over-commitment if the new workload is grouped with the candidate mix of virtual machines is determined, and whether that risk is acceptable. If the risk is acceptable, the new workload is provisioned by over-committing the candidate mix of virtual machines with the new virtual machine running on the cloud infrastructure.

Figure 4A:
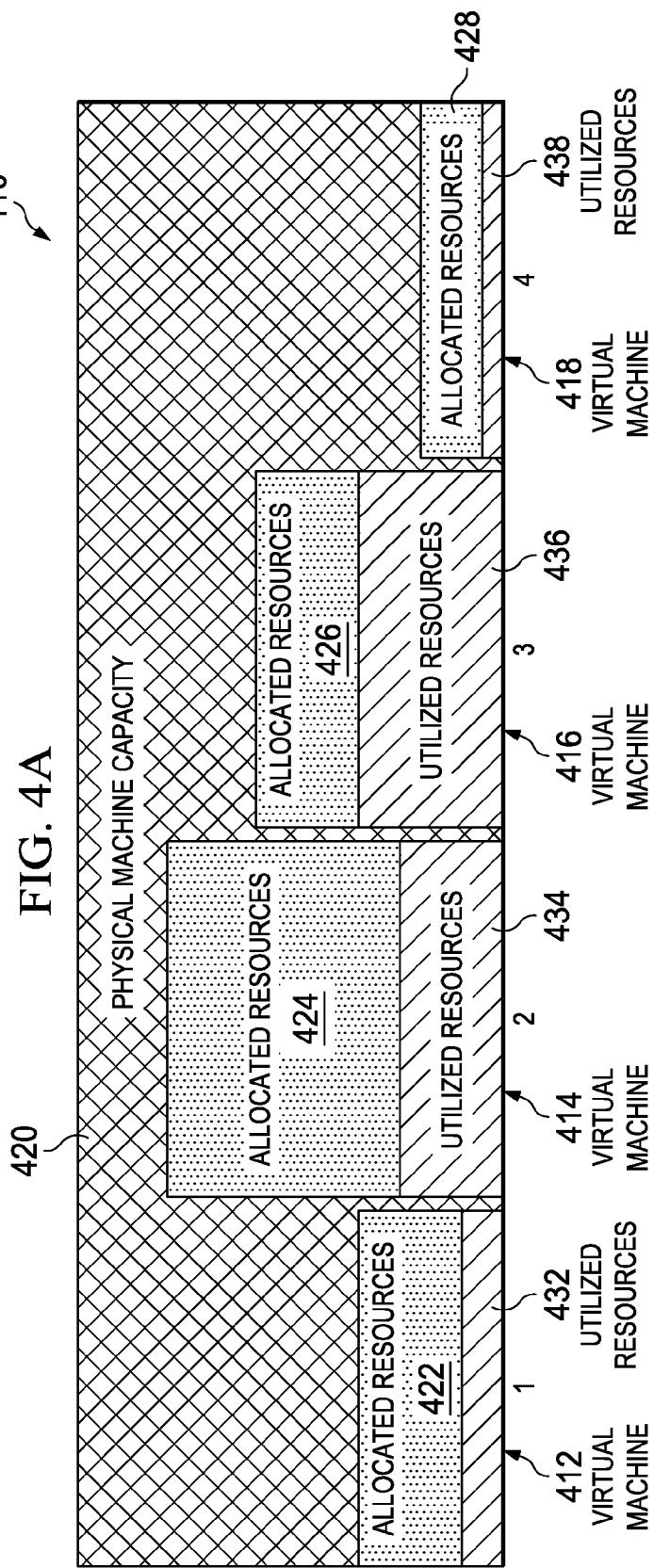
FIG. 4 is a cloud infrastructure is indicated hosting a plurality of virtual machines, each running a workload depicted in accordance with an illustrative embodiment.
Figure 4B:
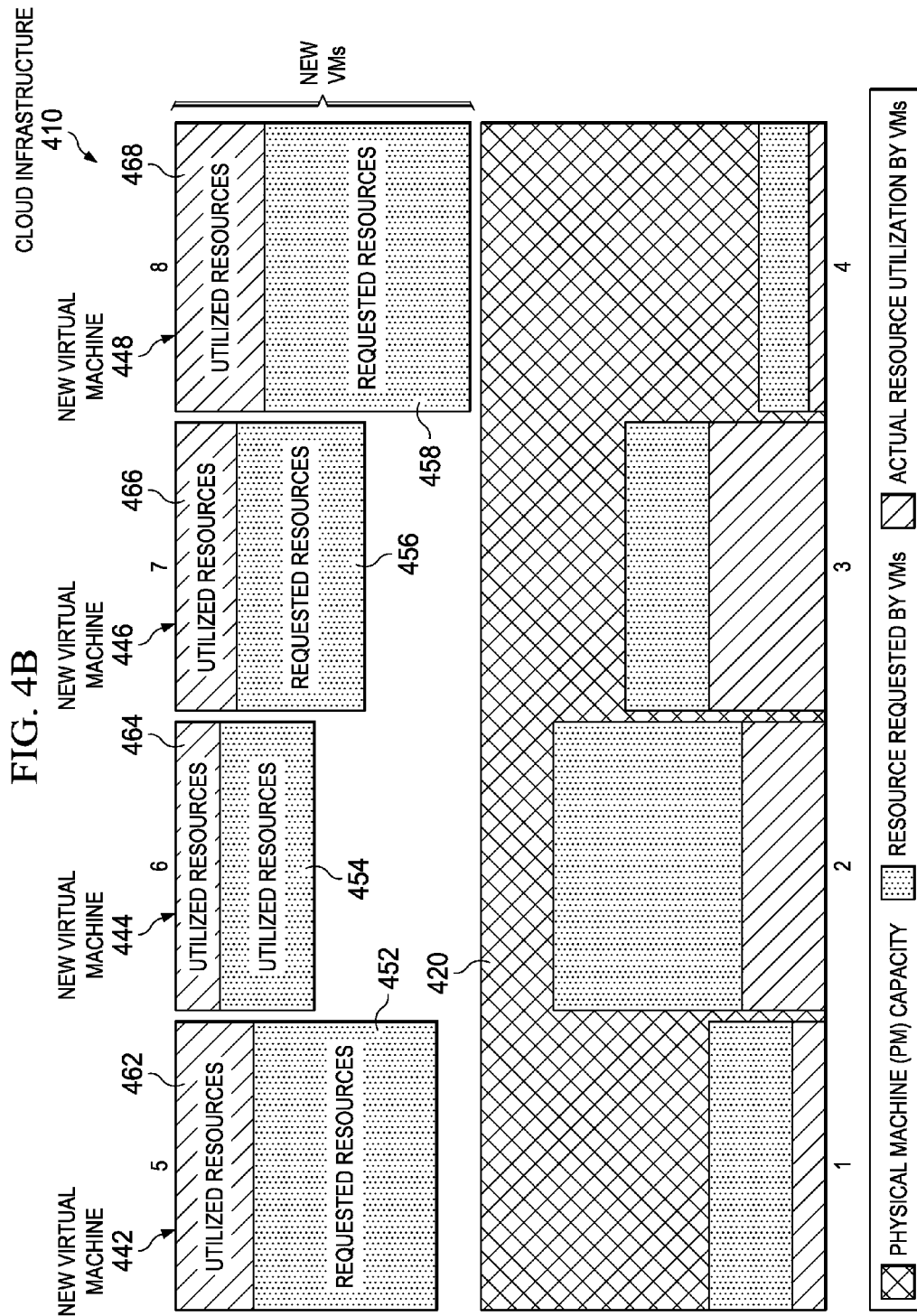

Referring now to FIG. 4, and specifically FIG. 4A, a cloud infrastructure is indicated hosting a plurality of virtual machines, each running a workload. Cloud infrastructure 410 is a cloud infrastructure, such as cloud infrastructure 250 of FIG. 2.

Cloud infrastructure 410 hosts virtual machine 412, virtual machine 414, virtual machine 416, and virtual machine 418. Each of virtual machines 412-418 executes a workload within the respective one of virtual machines 412-418. Each of virtual machines 412-418 requests some portion of the physical machine capacity 420 of cloud infrastructure 410. Allocated resources 422 have been allocated from physical machine capacity 420 for virtual machine 412. Allocated resources 424 have been allocated from physical machine capacity 420 for virtual machine 414. Allocated resources 426 have been allocated from physical machine capacity 420 for virtual machine 416. Allocated resources 428 have been allocated from physical machine capacity 420 for virtual machine 418.

At any given point in time, each of virtual machines 412-418 consumes only some fraction of the resources allocated to it. Utilized resources 432 are that portion of allocated resources 422 that are currently in use by virtual machine 412. Utilized resources 434 are that portion of allocated resources 424 that are currently in use by virtual machine 414. Utilized resources 436 are that portion of allocated resources 426 that are currently in use by virtual machine 416. Utilized resources 438 are that portion of allocated resources 428 that are currently in use by virtual machine 418.

Physical machine capacity 420 is not entirely allocated to virtual machines 412-418. Additionally, for each of virtual machines 412-418, allocated resources 422-428 exceed utilized resources 432-438. Therefore, cloud infrastructure 410 is a good candidate for allocation of additional virtual machines.

Referring now to FIG. 4 B, cloud infrastructure 410 has received requests for the placement of additional virtual machines. Each of new virtual machines 442-448 requests some portion of the physical machine capacity 420 of cloud infrastructure 410. Requested resources 452 have been requested from physical machine capacity 420 by new virtual machine 442. Requested resources 454 have been requested from physical machine capacity 420 by new virtual machine 444. Requested resources 456 have been requested from physical machine capacity 420 by new virtual machine 446. Requested resources 458 have been requested from physical machine capacity 420 by new virtual machine 448.

According to historical data, each of new virtual machines 442-448 consumes only some fraction of the resources allocated to it. Utilized resources 462 are that portion of requested resources 452 that are historically used by virtual machine 442. Utilized resources 464 are that portion of requested resources 454 that are historically used by virtual machine 444. Utilized resources 466 are that portion of requested resources 456 that are historically used by virtual machine 446. Utilized resources 468 are that portion of requested resources 458 that are historically used by virtual machine 448.

Referring now to FIG. 4 C, cloud infrastructure 410 has allocated some portion of the physical machine capacity 420 for each of new virtual machines 442-448. Allocated resources 472 have been allocated from physical machine capacity 420 for new virtual machine 442. Allocated resources 474 have been allocated from physical machine capacity 420 for new virtual machine 444. Allocated resources 476 have been allocated from physical machine capacity 420 for new virtual machine 446. Allocated resources 478 have been allocated from physical machine capacity 420 for new virtual machine 448.

Additionally, cloud infrastructure has over-committed some portion of the physical machine capacity 420 in order to fulfill requested resources of each provisioned virtual machine. Because each virtual machine is not utilizing the entirety of their allocated resources, cloud infrastructure is able to allocate those unused resources between a plurality of virtual machines in order fulfill the resource requests for each of the virtual machines. Over-committed resource 482 is allocated to both virtual machine 412 and new virtual machine 442. However, because neither virtual machine 412 nor new virtual machine 442 concurrently utilizes the entirety of their allocated resources, cloud infrastructure 410 is able to allocate over-committed resource 482 to both virtual machine 412 and new virtual machine 442. So long as aggregate resource usage for virtual machine 412 and new virtual machine 442 does not exceed the total aggregated capacity for both virtual machine 412 and new virtual machine 442, the over-commitment of over-committed resource 482 does not negatively impact performance of either virtual machine 412 or new virtual machine 442.

Over-committed resource 484 is allocated to both virtual machine 414 and new virtual machine 444. However, because neither virtual machine 414 nor new virtual machine 444 concurrently utilizes the entirety of their allocated resources, cloud infrastructure 410 is able to allocate over-committed resource 484 to both virtual machine 414 and new virtual machine 444. So long as aggregate resource usage for virtual machine 414 and new virtual machine 444 does not exceed the total aggregated capacity for both virtual machine 414 and new virtual machine 444, the over-commitment of over-committed resource 484 does not negatively impact performance of either virtual machine 414 or new virtual machine 444.

Over-committed resource 486 is allocated to both virtual machine 416 and new virtual machine 446. However, because neither virtual machine 412 nor new virtual machine 446 concurrently utilizes the entirety of their allocated resources, cloud infrastructure 410 is able to allocate over-committed resource 486 to both virtual machine 416 and new virtual machine 446. So long as aggregate resource usage for virtual machine 416 and new virtual machine 446 does not exceed the total aggregated capacity for both virtual machine 416 and new virtual machine 446, the over-commitment of over-committed resource 486 does not negatively impact performance of either virtual machine 416 or new virtual machine 446.

Over-committed resource 488 is allocated to both virtual machine 418 and new virtual machine 448. However, because neither virtual machine 418 nor new virtual machine 448 concurrently utilizes the entirety of their allocated resources, cloud infrastructure 410 is able to allocate over-committed resource 488 to both virtual machine 418 and new virtual machine 448. So long as aggregate resource usage for virtual machine 418 and new virtual machine 448 does not exceed the total aggregated capacity for both virtual machine 418 and new virtual machine 448, the over-commitment of over-committed resource 488 does not negatively impact performance of either virtual machine 418 or new virtual machine 448.

The major risk in over-committing of physical resources is of course that aggregate usage of the over-committed resources by the hosted workloads exceeds the available physical capacity of shared resources of the provider's cloud infrastructure. If aggregate usage exceeds the available capacity, then in the best case, service response time of some or all requests of the hosted workloads may significantly degrade. In the worst case, the entire cloud infrastructure can crash. Therefore, on-line identification of candidate workloads for over-committing and quantification of risks associated with over-committing resources are two key issues when resources are to be over-committed.

The embodiments referred to herein describe a statistical analysis based method to estimate the risks associated with over-committing shared resources for an arbitrary combination of workloads. The method makes use of historical resource usage data for candidate workloads considered for over-commitment of resources. Using historical data, usage of the shared over-committed resources by the group of workloads is predicted over their predicted execution time as a whole.

Virtual machines (VMs) are provisioned with a requested number of virtual processors (vCPUs) along with memory (RAM) and disk capacity. A virtual processor refers to a virtual processor as seen by a virtual machine. Such a virtual processor is a representation of a physical processor to the operating system of a logical partition that uses shared processors. In an illustrative embodiment, a virtual processor is roughly half of a thread of a hyper-threaded real physical processor. Thus, if the total number of physical processors on a physical machine is $C_{total}$, the maximum number of virtual processors ($vC_{total}$) that can be supported without over-commit is $2C_{total}$.

Processor utilization of a virtual machine ($U_{vm}$) for a time interval T is defined as follows:

$$U_{vm} = \frac{\text{CPU\_time}_T}{vT}$$

where,

CPU_time$_T$ is a total processor time spent by the virtual machine across all the virtual processors during the time interval T; and v is a total number of virtual processors allocated to a virtual machine.

For a group of $n_v$ virtual machines, we define aggregate processor utilization ($U_{group}$) for a group of virtual machines during a time interval T as:

$$U_{group} = \frac{\sum_{i=1}^{n_V} \text{CPU\_time}_T^{(i)}}{\text{Min.}\left\{\sum_{i=1}^{n_V} vC_i, vC_{total}\right\}}$$

where,

CPU_time$_T^{(i)}$ is a total processor time spent by the i-th virtual machine across all the virtual processors during the time interval T, $vC_i$ is a number of virtual processors allocated to the i-th virtual machine; and $vC_{total}$ is a maximum number of virtual processors that can be supported on a physical machine without over-commit.

Figure 5:
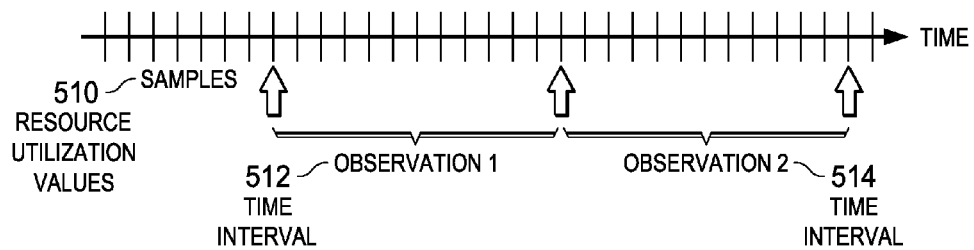
FIG. 5 is a conceptual view of samples and observations in accordance with an illustrative embodiment.

For each virtual machine or for a group of virtual machines, a sample is processor utilization values at a specific time instance. An observation is a set of samples collected over a time interval. FIG. 5 shows a conceptual view of samples and observations.

For each virtual machine, or candidate mix of virtual machines, specific resource utilization values 510 are determined over an observation time interval, such as time interval 512 and time interval 514. Each specific resource utilization values 510 is not an average utilization occurring over the time period, but rather a random utilization sample of resource utilization occurring within the time period.

In an infrastructure as a service (IaaS) cloud environment, when users sign up for a Cloud based service, the users can provision one or more virtual machine instances with specific processor capacity, memory (RAM) capacity, and disk capacity. An infrastructure service level agreement (SLA) is a way to assure infrastructure as a service Cloud users that they are entitled to a guaranteed service for which they are charged. During a service period, a service level agreement violation occurs if the user is unable to receive any of the promised computing resources (processor capacity, memory (RAM) capacity, or disk capacity) provisioned with the virtual machine.

A predictive approach for resource over-commit analysis of the illustrative embodiments includes a concept of safety margin. The illustrative embodiments estimate the risk of service level agreement violation on an over-committed physical machine by analyzing a random utilization sample rather than the average utilization behavior. Because even one violation of a service level agreement can be very critical to a service provider, average utilization behavior is an inappropriate measure.

To capture these sudden transient peaks, the present invention introduces the notion of perceived safety margin. A perceived safety margin is a characteristic of a workload mix and contains a fraction of samples below a utilization level. From a given observation, risk of running a group of virtual machines on the same physical machine is estimated by comparing the gap between the safety margin and the set threshold.

Figure 6:
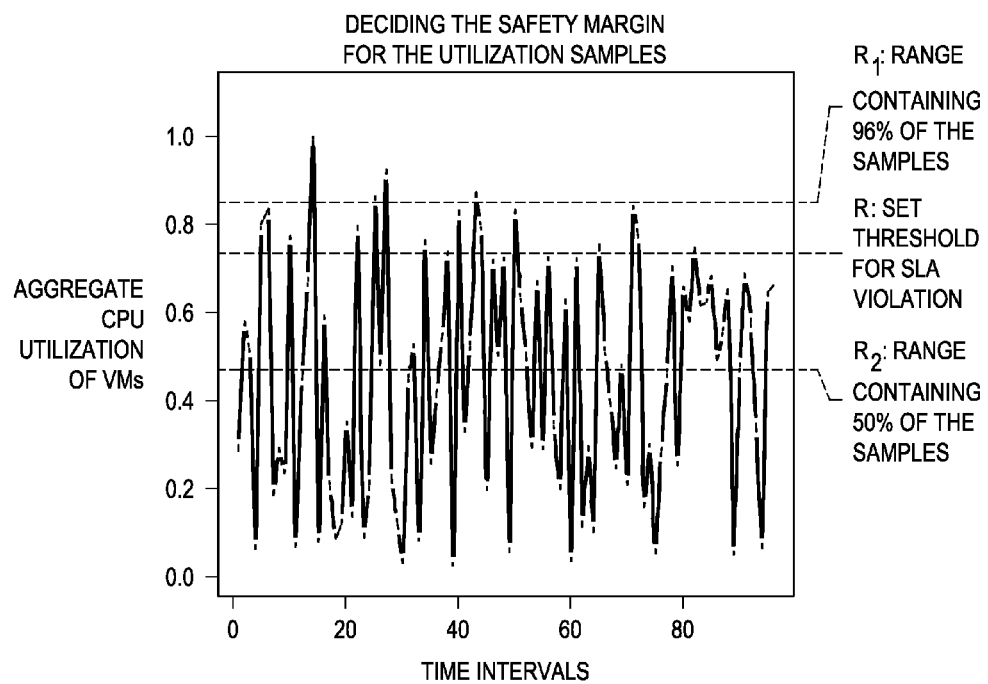
FIG. 6 is a chart of aggregate processor utilization used to estimate the risk of over-commit, shown according to an illustrative embodiment.

Referring now to FIG. 6, a chart of aggregate processor utilization used to estimate the risk of over-commit is shown according to an illustrative embodiment. Safety margin R 610 is a pre-defined set threshold for processor utilization. R 610 can be set, for example, by a service level agreement. R1 620 specifies a safety margin above R 610 that contains 96% of the samples. R2 630 is below R 610 but contains only 50% of the samples.

A predictive approach for resource over-commit analysis includes a concept of confidence on the data. For online analysis from a given observation, confidence on the data takes into account the uncertainty associated with an observation. Uncertainty is associated with the observation because actual or future processor utilization behavior is unknown and varies across different observations. Therefore, a confidence is necessary on the predicted safety margin to capture the uncertainty in the analysis based on the observation.

Given the risk and confidence characteristics, the illustrative embodiments use a tolerance interval to develop a predictive analytic method in estimating over-commit risk. The tolerance interval is a quality control.

To meet quality control, engineering or manufacturing products are sometimes required to satisfy certain tolerance specifications. In many practical cases, to save time and cost, a suitable tolerance interval is constructed based on a small number of product samples, to assess the fraction of the entire batch of products that is within the specifications.

By way of example, assume that a large number of items submitted for quality inspection will be accepted if at least 95% of the items are within the specification interval (L;U), where, L and U are the lower and upper specification limits respectively. To evaluate the quality of the items, only a small sample of items are inspected and a tolerance interval is computed with a given confidence, such that at least 95% of all items are within the tolerance interval. If the computed tolerance interval falls in the interval (L;U), then it can be concluded that at least 95% of the items can be accepted with a given confidence.

In this example, if the items are required to satisfy only the upper specification limit, a one-sided upper tolerance limit is computed to include at least 95% of the items with a given confidence and then compared with the value of U. There is a similarity between constructing a one-sided upper tolerance limit for the product samples and determining a safety margin for the utilization samples of a group of virtual machines that are over-committed on a physical machine. By comparing the externally set threshold (i.e., upper specification limit) on the aggregate virtual machine utilization with the safety margin (i.e., one-sided upper tolerance limit), risk of over-commit can be quantified.

$X_1, \ldots, X_n$ is set of utilization samples during an observation, drawn from a normal population with mean $\mu$ and variance $\sigma^2$. Where $\overline{X}$ denotes a sample mean and S denotes a sample standard deviation, given a number of samples n, a coverage factor $\beta$ ($0<\beta<1$) and a confidence $\gamma$ ($0<\gamma<1$), the one-sided upper tolerance limit is:

$$U(\beta,\gamma) = \overline{X} + cS$$

where, the tolerance factor c is determined so that:

$$P[P[X \le \overline{X} + cS | \overline{X}, S] \ge \beta] = \gamma$$

The tolerance factor c can be computed as:

$$c = \frac{t_{n-1,\gamma}(z_\beta \sqrt{n})}{\sqrt{n}}$$

where:

$z_\beta$ denotes the $100\beta$th percentile of the standard normal distribution;

$t_{n-1,\gamma}(z_\beta\sqrt{n})$ denotes the $100\gamma$th percentile of a non-central t distribution with (n−1) degrees of freedom; and $z_\beta\sqrt{n}$ is a non-centrality parameter.

Thus, at least $100\beta\%$ of the samples from the normal population are less than or equal to the one-sided upper tolerance limit $U(\beta,\gamma)$ with confidence $\gamma$. The coverage factor $\beta$ determines the fraction of samples that can be contained within the computed tolerance limit, whereas, the confidence $\gamma$ captures the dependency of such computation on a given observation.

Figure 7:
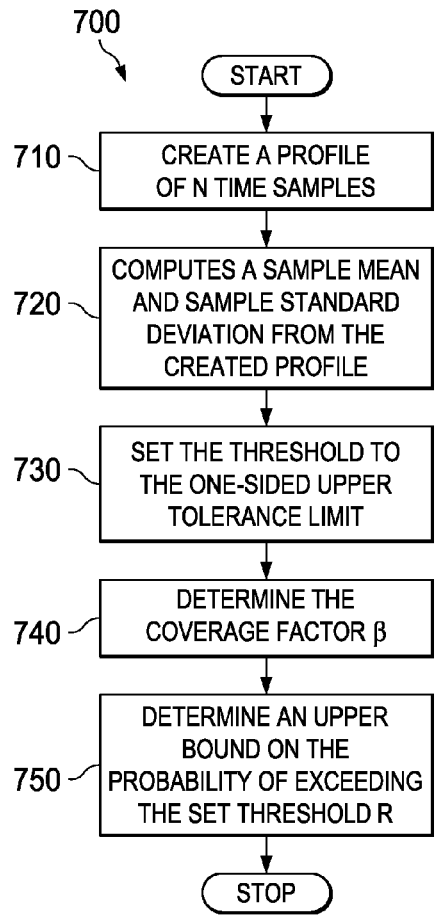
FIG. 7 is a flowchart of a process for predicting a probability that aggregate resource utilization by a group of virtual machines will exceed a pre-defined set threshold R over a time horizon, shown according to an illustrative embodiment.

Referring now to FIG. 7, a flowchart of a process for predicting a probability that aggregate resource utilization by a group of virtual machines will exceed a pre-defined set threshold R over a time horizon is shown according to an illustrative embodiment.

Process 700 begins by creating a profile of n time samples (step 710). The samples can be estimated or measured samples of the aggregate processor utilization for the group of virtual machines. The profile is used as an observation.

Process 700 computes a sample mean $\overline{X}$ and sample standard deviation S from the created profile (step 720).

Process 700 then sets the threshold to the one-sided upper tolerance limit (step 730). The one sided upper tolerance limit can be defined as:

$$R = \overline{X} + cS$$

Rearranging the above equation, the tolerance factor is:

$$c = \frac{R - \overline{X}}{S}$$

Process 700 then determines the coverage factor $\beta$ (step 740). For a given value of $\gamma$, the coverage factor $\beta$ can be determined by equating the two tolerance factor equations above, such that:

$$\frac{R - \overline{X}}{S} = \frac{t_{n-1,\gamma}(z_\beta \sqrt{n})}{\sqrt{n}}$$

Process 700 then determines an upper bound on the probability of exceeding the set threshold R (step 750). In one illustrative embodiment, the value of $(1-\beta)$ provides the upper bound on the probability of exceeding the set threshold R.

Utilizing the one sided upper tolerance limit as defined above, the confidence factor $\gamma$ can be alternatively defined as:

$$P[P[X \leq R|\overline{X},S] \leq \beta] = \gamma$$

Thus, for a given observation (characterized by $\overline{X}$, S), A is the probability that a new unknown utilization (denoted by the random variable X) will be less than R. That is, A is defined as follows:

$$A = P[X \leq R|\overline{X},S]$$

Utilizing this definition for A, the confidence factor $\gamma$ can be further simplified as:

$$P[A \geq \beta] = \gamma$$

Rearranging, the confidence factor $\gamma$ can be alternatively defined as:

$$P[(1-A) \leq (1-\beta)] = \gamma$$

Therefore, for a given confidence $\gamma$, lower bound on the value of A is $\beta$. Conversely, for a given observation, $(1-A)$ is the probability that a new unknown utilization will be exceeding R. Thus, upper bound on the value of $(1-A)$ is given by $(1-\beta)$, with confidence $\gamma$.

Figure 8:
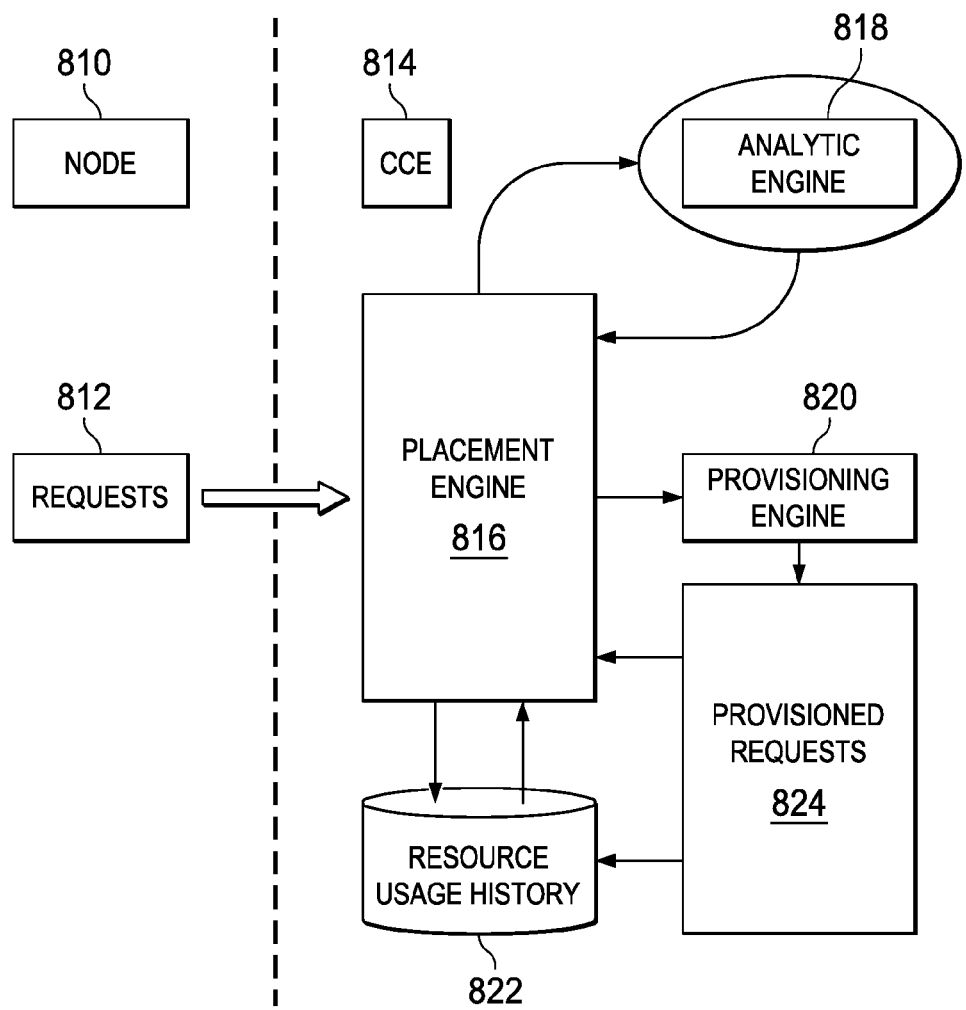
FIG. 8 is a data flow for the placement of workloads within an over-committed cloud system depicted in accordance with an illustrative embodiment.

Referring now to FIG. 8, a data flow for the placement of workloads within an over-committed cloud system is shown according to an illustrative embodiment. Cloud infrastructure 800 is a cloud infrastructure, such as cloud infrastructure 250 of FIG. 2. FIG. 8 describes the interactions among different components for placement and provisioning in an overcommitted infrastructure as a service cloud environment. The predictive analytics of the illustrative embodiments can be used to build an analytic engine. Node 810 is a node where a user can access cloud computing services, such as for example, one of nodes 210 of FIG. 2. Node 810 sends request 812 to cloud service provider 814. Request 812 is a request for provisioning of cloud computing services. Request 812 includes specifications for the services required by node 810. The specifications within request 812 may include, for example, but not limited to, networks, network bandwidth, servers, processing, memory, storage, applications, virtual machines, and services.

Cloud service provider 814 includes placement engine 816. Placement engine 816 is a software component that allocates hardware resources of cloud service provider 814 to utilize to fulfill request 812. According to an illustrative embodiment, placement engine 816 allocates hardware resources of cloud service provider 814 to utilize based on risk calculated by analytic engine 818.

Cloud service provider 814 includes analytic engine 818. Analytic engine 818 is a software component that identifies risks associated with the allocation of various workload groupings to hardware resources of cloud service provider 814. In one illustrative embodiment, analytic engine 818 executes a statistical analysis based method to estimate the risks associated with over-committing shared resources for an arbitrary combination of workloads. The risks for the arbitrary combination of workloads can then be utilized by placement engine 816 in determining to which hardware resources of cloud service provider 814 the various workloads should be allocated.

In response to a cloud user's request 812 for virtual machine provisioning, placement engine 816 together with the analytic engine 818 will check the feasibility of over-committing a physical machine to provision request 812.

Cloud service provider 814 includes provisioning engine 820. Analytic engine 818 is a software component that parses request 812, and expands request 812 into tasks for the provisioning of cloud resources according to the specifications within request 812. Provisioning engine 820 performs data monitoring and logging services for the various workloads executing on the cloud resources. Data obtained by the provisioning engine is stored within resource usage history 822.

Once request 812 is provisioned by the provisioning engine, cloud infrastructure 800 is instrumented to monitor and collect historical resource utilization samples of the provisioned virtual machines. These historical resource usage utilization samples of the virtual machines are used to generate utilization profiles during placement decision of subsequent requests for provisioning of cloud computing services. Provisioned requests 824 is a data structure listing the various cloud resources that have been provisioned to various workloads according to previously received requests. Cloud resources listed within provisioned requests 824 can include over-committed shared resources. In one illustrative embodiment, provisioned requests 824 also contains the historical resource usage utilization samples of the virtual machines that is used to generate utilization profiles during placement decision of subsequent requests for provisioning of cloud computing services.

Figure 9:
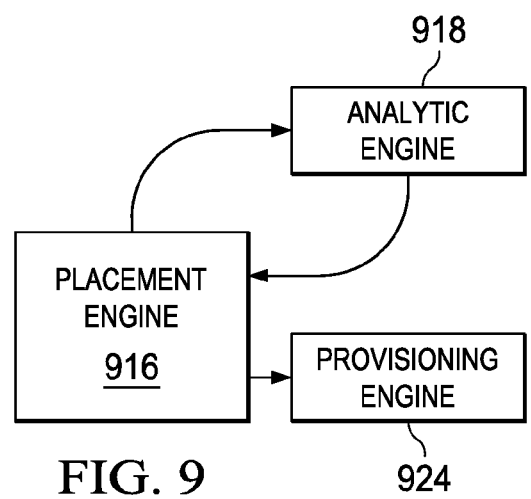
FIG. 9 is a high level workflow showing interactions among the various engines of a cloud infrastructure depicted in accordance with an illustrative embodiment.

Referring now to FIG. 9, a high level workflow is shown for interactions among the various engines of a cloud infrastructure. Cloud infrastructure 900 is cloud infrastructure 800 of FIG. 8.

Placement engine 916 is placement engine 816 of FIG. 8. Analytic engine 918 is analytic engine 818 of FIG. 8. Provisioning engine 920 is provisioning engine 820 of FIG. 8.

When placement engine 916 receives a request for cloud services, such as request 812 of FIG. 8, Placement engine 916 forwards the specifications for the requested services received in the request to analytic engine 918.

Upon receiving the specifications for the requested services, analytic engine 918 determines whether services requested by the new request can be allocated on the cloud infrastructure, including through the utilizing of over-commitment of cloud resources. Analytic engine 918 then forwards the determination of the probabilistic risk of running services requested by the new request with the existing workloads provisioned to the cloud infrastructure. The determination can include any grouping of workloads in order utilized in minimizing the determined risk.

Placement engine 916 makes a decision on the placement of the services requested by the new request. Placement engine 916 forwards an affirmative decision, including workload groupings, to provisioning engine 920. Provisioning engine then allocates cloud resources among the various workloads, according to the workload groupings.

Figure 10:
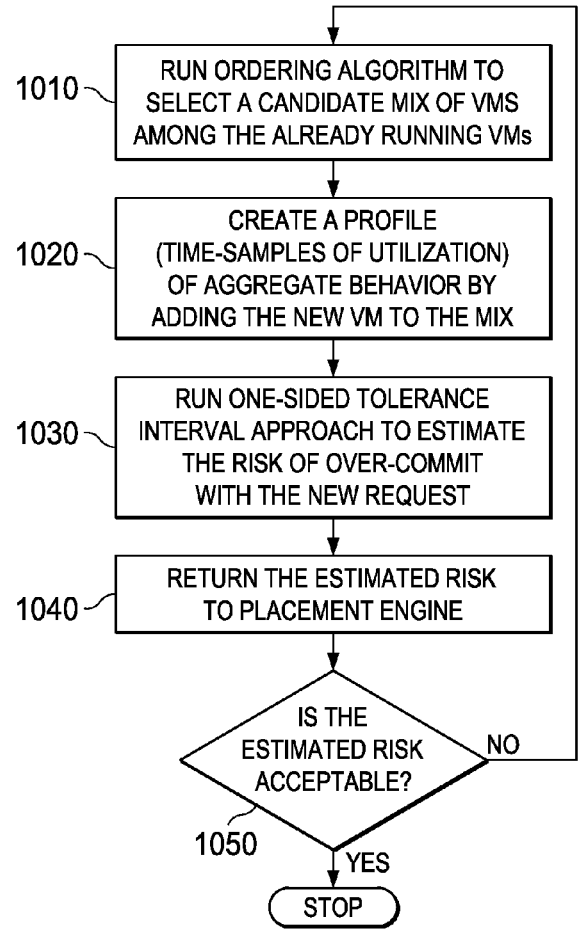
FIG. 10 is a flowchart for determining risk associated with the over-commitment of resources to a new virtual machine depicted in accordance with an illustrative embodiment.

Referring now to FIG. 10, a flowchart for determining risk associated with the over-commitment of a new virtual machine is shown according to an illustrative embodiment. Process 1000 is a software process, executing on one or more software components, such as placement engine 816 and analytic engine 818 of FIG. 8.

Responsive to a request being received by a cloud infrastructure for the provisioning of a new workload, process 1000 begins by running an ordering algorithm to select a candidate mix of virtual machines among the already running on the cloud infrastructure (step 1010). The ordering algorithm orders the already running virtual machines according to resource usage of the cloud infrastructure.

Responsive to running the ordering algorithm, process 1000 creates a time-sample utilization profile for an aggregate behavior of the new workload, and the virtual machines already running on the cloud infrastructure (step 1020). The time-sample utilization profile is estimated or measured aggregate resource utilization for a particular workload grouping, measured over a time interval.

Responsive to creating the time sample utilization profile, process 1000 determines the risk inherent in over-commitment if the new workload is grouped with the identified the (step 1030). In one illustrative embodiment, the risk is determined using a one-sided tolerance interval approach. Process 1000 then forwards the determined risk to a placement engine (step 1040).

Process 1000 then determines whether the determined risk is an acceptable risk (step 1050). If the risk is acceptable ("yes" at step 1050), the process terminates. The workload groupings can then be utilized by a provisioning engine for provisioning the workloads according to the identified groupings. If the risk is not acceptable ("no" at step 1060), then the process iterates back to step 1010 to select a different candidate mix of virtual machines.

Figure 11:
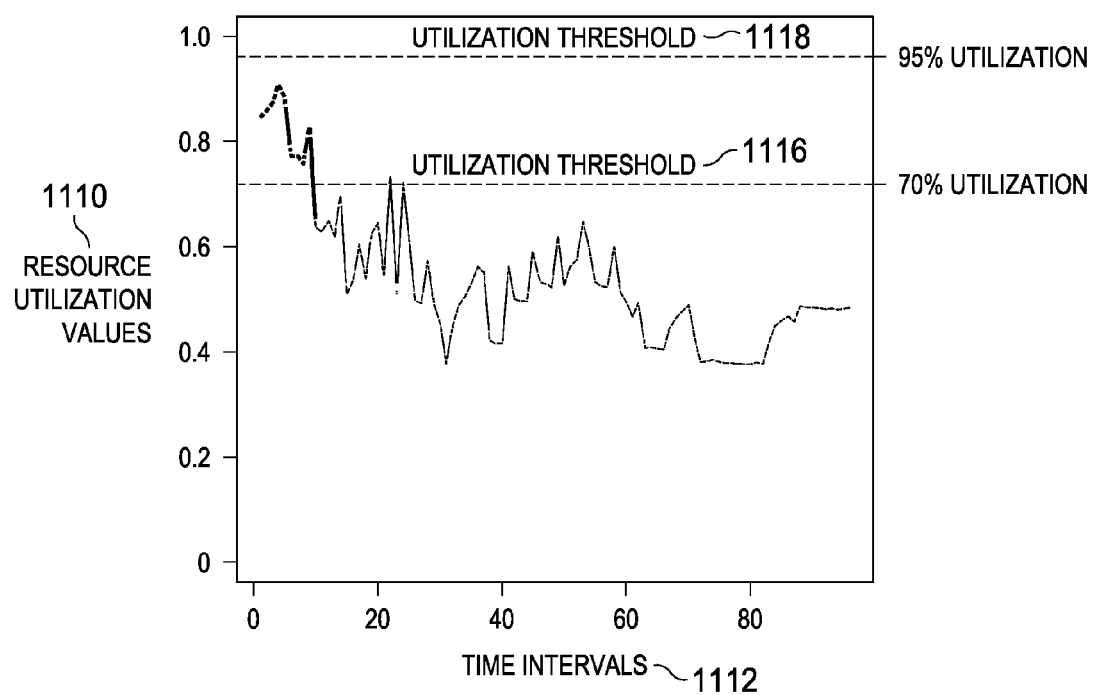
FIG. 11 is an exemplary graph of specific resource utilization values over time depicted in accordance with an illustrative embodiment.

Referring now to FIG. 11, an exemplary graph of specific resource utilization values over time is shown according to an illustrative embodiment. Resource utilization values 1110 are specific resource utilization values 810 of FIG. 8. Time intervals 1112 are time intervals such as time interval 812 and time interval 814 of FIG. 8.

Utilization threshold 1116 and utilization threshold 1118 are externally set, user defined utilization percentages. Utilization threshold 1116 and utilization threshold 1118 define percentage utilization of aggregate resource usage of a workload grouping as to the total aggregated capacity allocated to the workload grouping.

Figure 12:
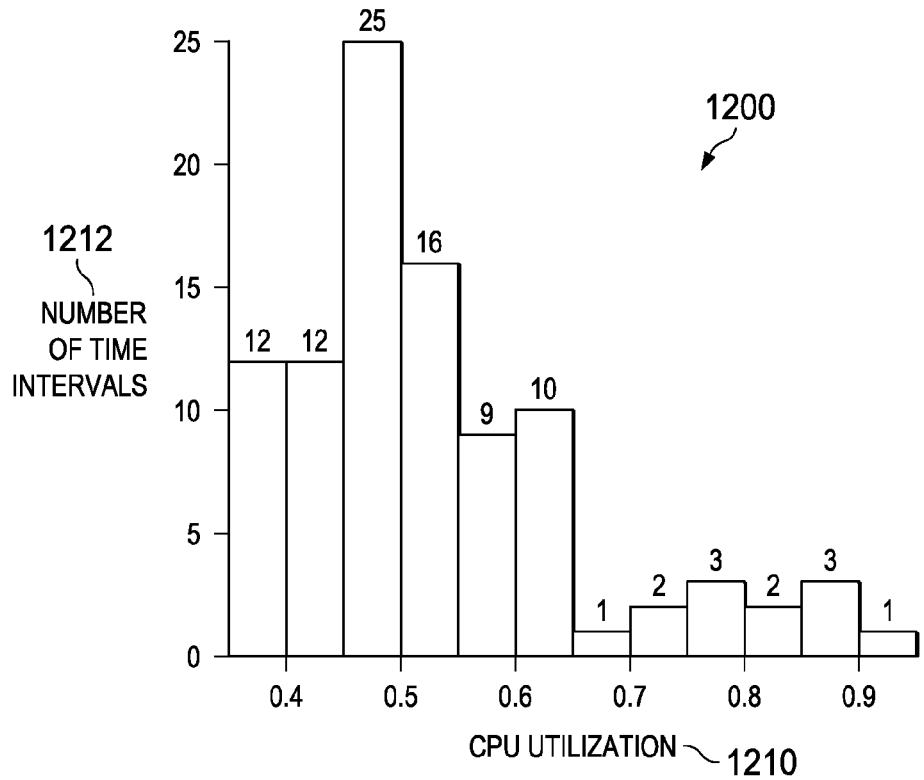
FIG. 12 is an exemplary histogram of aggregate resource utilization depicted in accordance with an illustrative embodiment.

Referring now to FIG. 12, a exemplary histogram of aggregate resource utilization is shown according to an exemplary embodiment. Histogram 1200 is a graphical representation of a number of times that resource utilization for the workload grouping falls within a defined range.

Resource utilization 1210 is specific resource utilization values 510 of FIG. 5. Number of time intervals 1212 is a number of times that resource utilization for the workload grouping falls within a defined range is determined based on the time intervals over which resource utilization was determined, such as time interval 512 and time interval 514 of FIG. 5.

Figure 13:
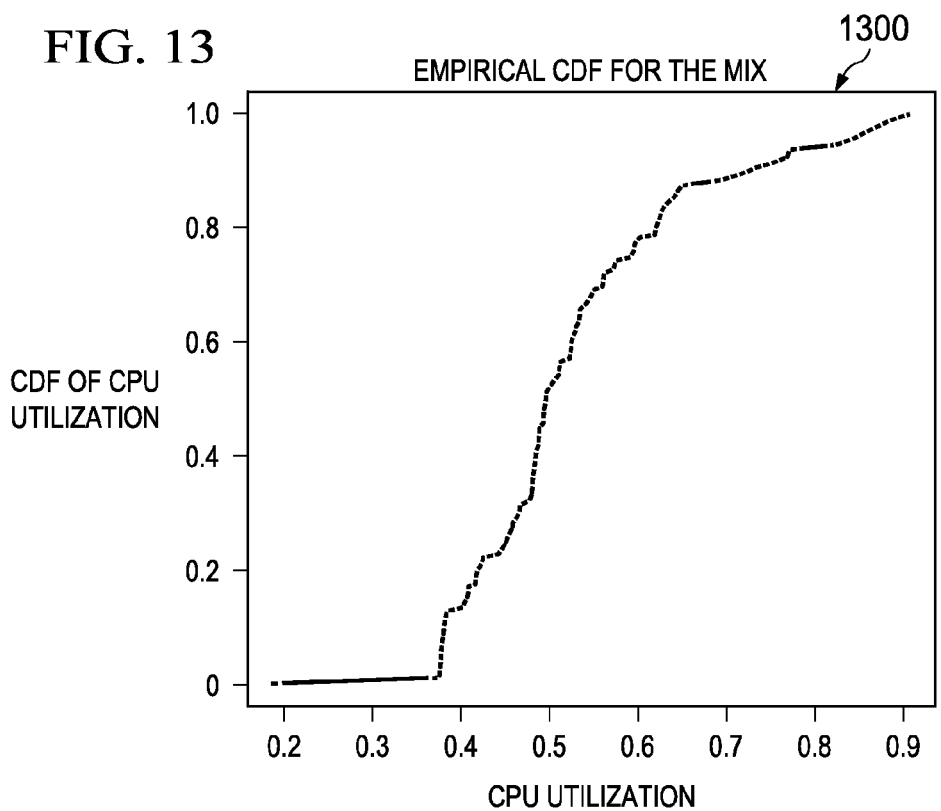
FIG. 13 is an exemplary cumulative distribution function of aggregate resource utilization depicted in accordance with an illustrative embodiment.

Referring now to FIG. 13, an exemplary cumulative distribution function of aggregate resource utilization is shown according to an exemplary embodiment. The cumulative distribution function as illustrated in plot 1300, is a probability that the current resource utilization by a workload grouping will be less than some threshold value. Cumulative distribution of resource utilization is then used in determining the one-sided tolerance interval.

Figure 14:
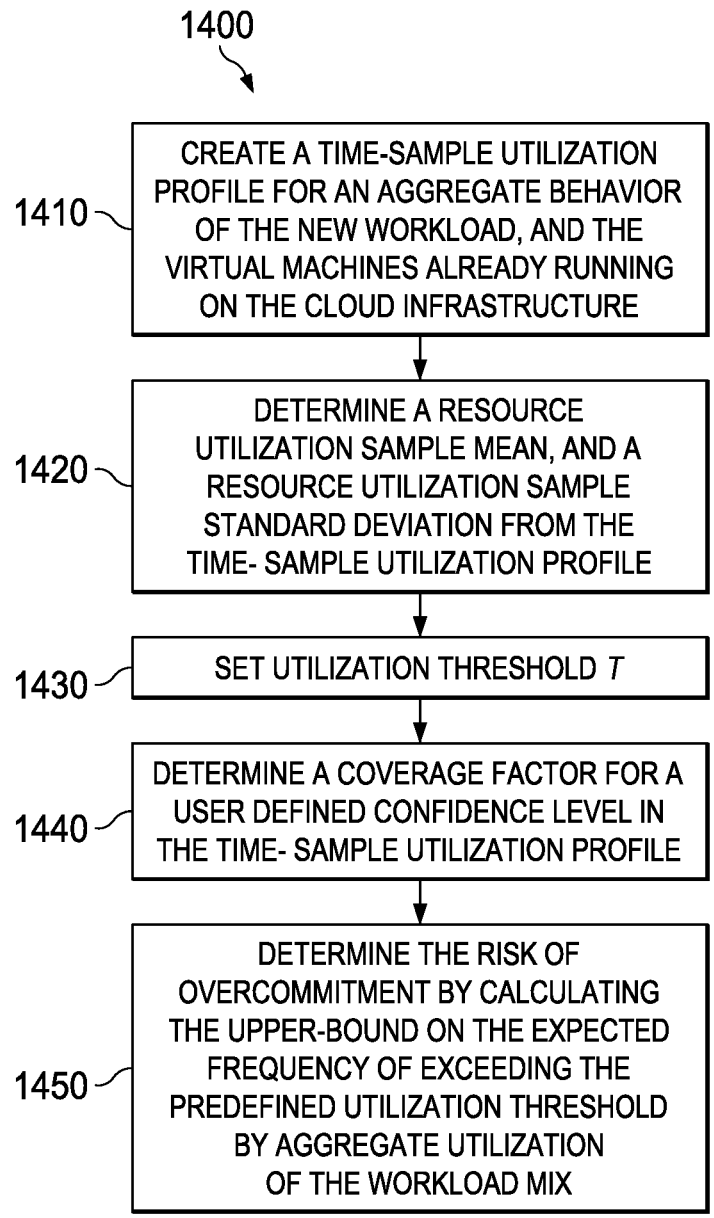
FIG. 14 is a flowchart for determining the risk of the aggregate utilization exceeding a utilization threshold, depicted in accordance with an illustrative embodiment.

Referring now to FIG. 14, a flowchart is shown for determining the risk of the aggregate utilization of a workload mix exceeding a utilization threshold. Process 1400 is a software process, executing on one or more software components, such as placement engine 816 and analytic engine 818 of FIG. 8.

Process 1400 begins by creating a time-sample utilization profile for an aggregate behavior of the new workload and the virtual machines already running on the cloud infrastructure (step 1410). The time-sample utilization profile is estimated or measured aggregate resource utilization for a particular workload grouping, measured over a time interval.

Process 1400 then determines a resource utilization sample mean, and a resource utilization sample standard deviation from the time-sample utilization profile (step 1420). Process 1400 then sets a utilization threshold T (step 1430). The utilization threshold can be, for example, The one-sided tolerance factor can then be defined as follows:

$$c = \frac{T - \overline{X}}{S}$$

Process 1400 then determines a coverage factor for a user defined confidence level in the time-sample utilization profile (step 1440). The coverage factor can be determined by solving for β. That is, coverage factor β can be determined from:

$$c = \frac{T - \overline{X}}{S} = \frac{1}{\sqrt{n}} t_{n-1,\gamma}(z_\beta \sqrt{n})$$

Once the user defined confidence level in the time-sample utilization profile is determined, process 1400 determines the risk of overcommitment by calculating the upper-bound on the expected frequency of exceeding the predefined utilization threshold by aggregate utilization of the workload mix (step 1450). In one illustrative embodiment, the upper-bound is determined from:

$$UB = 1 - \beta$$

Referring now to FIG. 15, a table of exemplary predicted aggregate utilization for a workload grouping for various confidence levels is shown according to an illustrative embodiment. Table 1500 shows predicted aggregate utilization for the workload grouping of the example as shown in FIG. 8-FIG. 11.

For the exemplary predicted aggregate utilization for a workload grouping, resource utilization was determined at 96 separate time intervals. Of the total number of time intervals, 11 time intervals exceeded a utilization threshold of 0.70. The utilization threshold of 0.70 is utilization threshold 1116 of FIG. 11. Thus, based on the resource utilization for the 96 separate time intervals, an empirical probability for exceeded the utilization threshold of 0.70 is determined to be 11.46%.

For the exemplary predicted aggregate utilization for a workload grouping, resource utilization was determined at 96 separate time intervals. Of the total number of time intervals, 0 time intervals exceeded a utilization threshold of 0.95. The utilization threshold of 0.95 is utilization threshold 1118 of FIG. 11. Thus, based on the resource utilization for the 96 separate time intervals, an empirical probability for exceeded the utilization threshold of 0.95 is determined to be 0%.

Referring now to FIG. 16, a table showing an exemplary quantification of risk for an aggregate utilization of a workload grouping exceeding a upper tolerance threshold is shown according to an illustrative embodiment. Table 1600 shows quantification of risk for the workload grouping of the example as shown in FIG. 8-FIG. 11.

The upper tolerance threshold provides an upper bound on the utilization behavior for a fraction of samples given a particular confidence. The upper tolerance threshold is a function of the given coverage factor $\beta$ and confidence level $\gamma$. That is, the upper tolerance limit can be defined as:

$$U(\beta, \gamma)$$

Risk that an aggregate utilization of a workload grouping exceeding an upper tolerance threshold is determined based on a given coverage factor, and a specific confidence level. Risk is defined as:

$$\frac{U(\beta, \gamma) - T}{T}$$

As is shown in Table 1600, for a given confidence $\gamma$, an increase in coverage factor $\beta$ results in increased risk that the aggregate utilization of a workload grouping exceeding an upper tolerance threshold. That is, as coverage factor $\beta$ accounts for larger fraction of sample sizes within the tolerance limit, the risk that one of those samples will exceed the upper tolerance threshold correspondingly increases.

The embodiments referred to herein describe a statistical analysis based method to determine the risks associated with over-committing shared resources for an arbitrary combination of workloads. The method makes use of historical resource usage data for candidate workloads considered for over-commitment of resources. Using historical data, usage of the shared over-committed resources by the group of workloads is predicted over their predicted execution time as a whole.

A confidence level is then specified in the predicted usage of the shared over-committed resources. The confidence level is a user defined threshold under which processor usage falls, corresponding to a given probability. For the specified confidence, a statistical measure one sided tolerance interval is computed for the predicted usage of the shared over-committed resources. Using the analytic expression for one sided tolerance interval, a coverage factor value is computed. The coverage factor provides a lower bound estimate on a percentage of the shared over-committed resources that will be within an acceptable operating range for the specified confidence given the over-commitment of resources. From the coverage factor, an upper bound on the number of times the safe operating range violation can be determined.

The risk of aggregate usage of the over-committed resources demand exceeding available shared resource capacity by a particular group of workloads is then determined using the coverage factor. By comparing risks associated with different candidate workload mixes, a workload mix that minimizes the risk of aggregate usage of the over-committed resources demand exceeding available shared resource capacity is targeted for placement on a shared resource.

Thus, the illustrative embodiments described herein provide a computer-implemented method for determining risk associated with over-committing shared resources. In response to receiving a request to provision a new workload, a candidate mix of virtual machines is selected from plurality of virtual machines already running on a cloud infrastructure. A utilization profile is then created for an aggregate behavior of the candidate mix of virtual machines and a new virtual machine running the new workload. A risk inherent in over-commitment if the new workload is grouped with the candidate mix of virtual machines is determined, and whether that risk is acceptable. If the risk is acceptable, the new workload is provisioned by over-committing the candidate mix of virtual machines with the new virtual machine running on the cloud infrastructure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to explain best the principles of the embodiment, the practical application or technical improvement over technologies found in the marketplace, or to enable others of ordinary skill in the art to understand the embodiments disclosed The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for provisioning a virtual machine onto shared physical resources, the method comprising:
identifying a set of workload characteristics for a candidate mix of virtual machines; determining a probability that an aggregate resource utilization by the virtual machine and the candidate mix of virtual machines exceeds a predefined set threshold for resource utilization over a time horizon, wherein the step of determining the probability that the aggregate resource utilization by the candidate mix of virtual machines exceeds the predefined set threshold for resource utilization over the time horizon further comprises: creating a profile of a set of time samples for the aggregate resource utilization by the candidate mix; determining a sample mean and sample standard deviation from the created profile; setting the predefined set threshold to a one-sided upper tolerance limit of the created profile; determining a coverage factor for the created profile; and determining an upper bound on the probability of exceeding the set threshold; and
provisioning the virtual machine along with the candidate mix of virtual machines to a physical machine.

2. The computer implemented method of claim 1, wherein the one-sided upper tolerance limit is a percentage of the plurality of time intervals that exhibit resource utilization less than the predefined set threshold.

3. The computer implemented method of claim 1, wherein the one-sided upper tolerance limit is determined such that a probability of resource utilization by the virtual machine and the candidate mix of virtual machines is equal to a user defined confidence level.

4. The computer implemented method of claim 1, further comprising:
determining a coverage factor, wherein the coverage factor is a fraction of a plurality of resource utilizations for the virtual machine and the candidate mix of virtual machines that can be captured by the computed tolerance limit over at least one of the plurality of time intervals.

5. The computer implemented method of claim 1, further comprising:
determining a risk, wherein the risk is an expected probability of exceeding the utilization threshold by the virtual machine and the candidate mix.

6. The computer implemented method of claim 5, further comprising:
responsive to determining that the risk is not acceptable, selecting a second candidate mix of virtual machines among a plurality of virtual machines already running on the cloud infrastructure.

7. A method of minimizing risk associated with over-committing shared resources, the method comprising:
identifying a first set of workload characteristics for a first set of virtual machines executing on a first set of physical machines;
identifying a second set of workload characteristics for a second set of virtual machines executing on a second set of physical machines;
identifying a current probability that an aggregate resource utilization by the first set of virtual machines and the second set of virtual machines exceeds a predefined set threshold for resource utilization over a time horizon
determining a prospective probability that the aggregate resource utilization by the first set of virtual machines and the second set of virtual machines exceeds the predefined set threshold for resource utilization over the time horizon if the first set of virtual machines and the second set of virtual machines are reallocated among the first set of physical machines and the second set of physical machines, wherein the step of determining a prospective probability that the aggregate resource utilization by the first set of virtual machines and the second set of virtual machines exceeds the predefined set threshold for resource utilization over the time horizon further comprises: creating a profile of a set of time samples for the aggregate resource utilization by a candidate mix of the first set of virtual machines and the second set of virtual machines;
determining a sample mean and sample standard deviation from the created profile; setting the predefined set threshold to a one-sided upper tolerance limit of the created profile; determining a coverage factor for the created profile; and determining an upper bound on the probability of exceeding the set threshold; and
responsive to determining that the prospective probability is less than the current probability, reallocating the first set of virtual machines and the second set of virtual machines among the first set of physical machines and the second set of physical machines.

8. The computer implemented method of claim 7, wherein the one-sided upper tolerance limit is a percentage of the plurality of time intervals that exhibit resource utilization less than the predefined set threshold.

9. The computer implemented method of claim 7, wherein the one-sided upper tolerance limit is determined such that a probability of resource utilization by the candidate mix of virtual machines is equal to a user defined confidence level.

10. The computer implemented method of claim 7, further comprising:
determining a coverage factor, wherein the coverage factor is a fraction of a plurality of resource utilizations for the candidate mix of virtual machines that can be captured by the computed tolerance limit over at least one of the plurality of time intervals.

11. A computer program product for provisioning a virtual machine onto shared physical resources, the computer program product comprising:
a computer readable storage device having computer instructions encoded thereon;
instructions to identify a set of workload characteristics for a candidate mix of virtual machines;
instructions to determine a probability that an aggregate resource utilization by the virtual machine and the candidate mix of virtual machines exceeds a predefined set threshold for resource utilization over a time horizon, wherein the step of determining a prospective probability that the aggregate resource utilization by the first set of virtual machines and the second set of virtual machines exceeds the predefined set threshold for resource utilization over the time horizon further comprises: creating a profile of a set of time samples for the aggregate resource utilization by a candidate mix of the first set of virtual machines and the second set of virtual machines; determining a sample mean and sample standard deviation from the created profile: setting the predefined set threshold to a one-sided upper tolerance limit of the created profile; determining a coverage factor for the created profile; and determining an upper bound on the probability of exceeding the set threshold; and
instructions to provision the virtual machine and along with the candidate mix of virtual machines to a physical machine.

12. The computer program product of claim 11, wherein the one-sided upper tolerance limit is a percentage of the plurality of time intervals that exhibit resource utilization less than the predefined set threshold.

13. The computer program product of claim 11, wherein the one-sided upper tolerance limit is determined such that a probability of resource utilization by the virtual machine and the candidate mix of virtual machines is equal to a user defined confidence level.

14. The computer program product of claim 11, further comprising: instructions to determine a coverage factor, wherein the coverage factor is a fraction of a plurality of resource utilizations for the virtual machine and the candidate mix of virtual machines that can be captured by the computed tolerance limit over at least one of the plurality of time intervals.

15. The computer program product of claim 11, further comprising: instructions to determine a risk, wherein the risk is an expected frequency of exceeding the utilization threshold by the aggregate utilization of the virtual machine and the candidate mix.

16. The computer program product of claim 11, further comprising: instructions, responsive to determining that the risk is not acceptable, to select a second candidate mix of virtual machines among a plurality of virtual machines already running on the cloud infrastructure.

17. A data processing system to provision a virtual machine onto shared physical resources, the data processing system comprising:
one or more processor;
program instructions, stored on one or more computer readable storage devices for execution by the one or more processors to identify a set of workload characteristics for a candidate mix of virtual machines;
program instructions, stored on at least one of the one or more computer readable storage devices for execution by one or more processors via at least one of the one or more memories to determine a probability that an aggregate resource utilization by the candidate mix of virtual machines exceeds a predefined set threshold for resource utilization over a time horizon, wherein the instructions to determine the probability that the aggregate resource utilization by the candidate mix of virtual machines exceeds the predefined set threshold for resource utilization over the time horizon further comprises: program instructions to create a profile of a set of time samples for the aggregate resource utilization by the candidate mix; program instructions to determine a sample mean and sample standard deviation from the created profile; program instructions to set the predefined set threshold to a one-sided upper tolerance limit of the created profile; program instructions to determine a coverage factor for the created profile; and program instructions to determine an upper bound on the probability of exceeding the set threshold; and
program instructions, stored on at least one of the one or more computer readable storage devices for execution by one or more processors via at least one of the one or more memories to provision the candidate mix of virtual machines to a physical machine.

18. The data processing system of claim 17, wherein the one-sided upper tolerance limit is a percentage of the plurality of time intervals that exhibit a resource utilization less than the predefined set threshold.

19. The data processing system of claim 17, wherein the one-sided upper tolerance limit is determined such that a probability of resource utilization by the candidate mix of virtual machines is equal to a user defined confidence level.

20. The data processing system of claim 17, further comprising:
program instructions, stored on at least one of the one or more computer readable storage devices for execution by one or more processors via at least one of the one or more memories to determine a coverage factor, wherein the coverage factor is a fraction of a plurality of resource utilizations for the candidate mix of virtual machines that can be captured by the computed tolerance limit over at least one of the plurality of time intervals.

21. The data processing system of claim 17, further comprising:
program instructions, stored on at least one of the one or more computer readable storage devices for execution by one or more processors to determine a risk, wherein the risk is an expected frequency of exceeding the utilization threshold by the candidate workload mix.

22. The data processing system of claim 21, further comprising:
program instructions, stored on at least one of the one or more computer readable storage devices for execution by one or more processors responsive to determining that the risk is not acceptable, to select a second candidate mix of virtual machines among a plurality of virtual machines already running on the cloud infrastructure.

* * * * *